(12) United States Patent
Takahashi

(10) Patent No.: US 7,242,570 B2
(45) Date of Patent: Jul. 10, 2007

(54) VACUUM CAPACITOR

(75) Inventor: Eiichi Takahashi, Shizuoka (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 11/441,120

(22) Filed: May 26, 2006

(65) Prior Publication Data

US 2006/0266739 A1    Nov. 30, 2006

(30) Foreign Application Priority Data

May 30, 2005    (JP)    ............... 2005-156650

(51) Int. Cl.
*H01G 5/16* (2006.01)
(52) U.S. Cl. ............... 361/290; 361/278; 361/283.1; 361/283.4; 361/297; 361/298.1
(58) Field of Classification Search ............... 361/279, 361/272–277, 278, 280, 283.1, 283.2, 283.3, 361/283.4, 290–293, 297, 298.1; 73/706, 73/718, 724
See application file for complete search history.

(56) References Cited

U.S. PATENT DOCUMENTS 5,329,819 A * 7/1994 Park et al. ............... 73/724
5,343,757 A * 9/1994 Tate ............... 73/724
5,939,639 A * 8/1999 Lethbridge ............... 73/724
6,307,729 B1 * 10/2001 Fukai et al. ............... 361/303
6,462,930 B1 * 10/2002 Nemoto et al. ............... 361/279
6,975,499 B2 * 12/2005 Takahashi et al. ............... 361/277

FOREIGN PATENT DOCUMENTS

| JP | 06-204082 | 7/1994 |
| JP | 07-211588 | 8/1995 |
| JP | 08-097088 | 4/1996 |

* cited by examiner

*Primary Examiner*—Nguyen T. Ha
(74) *Attorney, Agent, or Firm*—Foley & Lardner LLP

(57) ABSTRACT

A vacuum capacitor including an insulating cylinder having first and second ends which are opposite to each other. A stationary-side flange is installed to the first end of the insulating cylinder. A stationary electrode supporting plate is installed to an inner surface side of the stationary-side flange. A movable-side flange is installed to the second end of the insulating cylinder. A movable electrode supporting plate is installed to an inner surface side of the movable-side flange through an electrostatic capacity adjusting screw and movable relative to the stationary electrode supporting plate by turning of the electrostatic capacity adjusting screw. Additionally, a diaphragm is sealingly connected between the movable-side flange and the movable electrode supporting plate, the diaphragm having corrugation and defining a vacuum side and an atmospheric side in the vacuum capacitor.

14 Claims, 7 Drawing Sheets

(EARLIER TECHNOLOGY)

(EARLIER TECHNOLOGY)

VACUUM CAPACITOR

BACKGROUND OF THE INVENTION

This invention relates to a vacuum capacitor to be used in an oscillator circuit of a supper power oscillator, a high frequency power circuit for a semiconductor producing apparatus, a tank circuit of an induction heating apparatus, or the like.

Vacuum capacitors are roughly structurally classified into a vacuum fixed capacitor whose electrostatic capacity value is fixed and a vacuum variable capacitor whose electrostatic capacity value is variable. An earlier technology vacuum variable capacitor is shown in FIG. 6 as a vertical sectional view. The vacuum variable capacitor includes an insulating cylinder 1 formed of ceramic or the like. The insulating cylinder 1 has one end to which a stationary-side flange 2 is installed, and the other end to which a movable-side flange 4 is installed through a sealing metal fitting 3, so that a vacuum container 5 is formed. The reference numerals 2a, 4a designate respectively female thread portions through which outside connection conductors are to be installed to the flanges 2, 4.

A plurality of cylindrical electrode plates which have respectively different diameters are coaxially disposed standing on the inner surface of the stationary electrode supporting plate 2 in such a manner as to be spaced a certain distance from each other, thereby forming a stationary electrode 6. Additionally, a center pin 8 formed of an insulating material is disposed standing at the central portion of the inner surface of the stationary-side flange 2 through a stationary guide 7. A cylindrical movable lead 9 is slidably fitted on the center pin 8. A movable electrode supporting plate 10 is installed to the movable lead 9. A plurality of cylindrical electrode plates having different diameters are coaxially disposed standing on the movable electrode supporting plates 10. Each cylindrical electrode plate is insertable into and withdrawable from a space between the adjacent cylindrical electrode plates of the stationary electrode 6 without contacting with the cylindrical electrodes of the stationary electrode, thereby forming a movable electrode 11. Additionally, a movable lead bolt section 9a is fixedly connected to the lower end of the movable lead 9 as a single member.

The movable-side flange 4 is formed at its central portion with a hole 4b defined by an inner peripheral portion of the flange 4. A cylindrical heat pipe 12 is disposed standing at the inner peripheral portion of the movable-side flange 4. A nut receiving section 13 is installed to the inner peripheral portion of the heat pipe 12. An adjusting nut 15 is rotatably installed through a bearing 14 to the nut receiving section 13. The adjusting nut 15 is formed at its inner peripheral portion with a female thread portion 15a which is engageable with the male thread portion 9b of the movable lead bolt 9a. The adjusting nut 15 is formed with a large-diameter hole section 15c which is contiguous with the female thread portion 15a through a step portion 15b. The movable lead bolt 9a is formed at its lower end portion with an axially extending female thread portion 9c with which an adjusting screw 16 is engaged, in which the a head portion 16a of the adjusting screw 16 is brought into engagement with the step portion 15b of the adjusting nut 15. The reference numeral 17 designates a bellows which is extensible conductor and define a vacuum side and an atmospheric side. The one end of the bellows 17 is attached to the movable electrode supporting plate 10 while the other end is attached to the movable-side flange 4.

With the above arrangement, in order to adjust the maximum electrostatic capacity value of the vacuum capacitor, first the adjusting nut 15 is slightly turned to the right to move the movable lead 9 downward from a position corresponding to the maximum electrostatic capacity value at which position the tip end of the movable lead bolt 9a is brought into contact with the tip end of the center pin 8, thereby adjusting the defined maximum electrostatic capacity value. Subsequently, the adjusting screw 16 is screwed into the female thread portion 9c until the head portion 16a of the adjusting screw 16 is brought into contact with the step portion 15b. Then, the adjusting screw 16 is fixed to the female thread portion 9c of the movable lead bolt 9a with an adhesive or the like. As a result, if the adjusting nut 15 is intended to be turned to the left from the position corresponding to the maximum electrostatic capacity value, it cannot be turned to the left since the head portion 16a of the adjusting screw is brought into contact with the step portion 15b.

Adjustment of the electrostatic capacity of the vacuum capacitor is carried out as follows: The movable lead bolt 9a moves downward when the adjusting nut 15 is turned to the right, and moves upward when the adjusting nut 15 is turned to the left. This moves the movable electrode 11 upward and downward to vary the total facing area between the movable electrode 11 and the stationary electrode 6, thereby adjusting the electrostatic capacity.

The movable lead 9 receives a force for pushing it up under the pressure differential between a vacuum on the vacuum side and an atmospheric pressure on the atmospheric side. The adjusting nut 15 also receives the same force so as to generate a surface pressure at the nut receiving section 13, so that a large rotational torque is required to turn the adjusting nut 15. However, since the bearing 14 is provided between the nut receiving section 13 and the adjusting nut 15, turning of the adjusting nut is easy. Additionally, since the heat pipe 12 is provided, heat generated in the bellows 17 upon current-flowing is absorbed and radiated through the heat pipe 12, the movable-side flange 4 and the outside connection conductor, thereby prolonging the life of the bellows 17 and other members.

An earlier technology vacuum fixed capacitor is shown in FIG. 7 in the form of a vertical sectional view. The vacuum fixed capacitor includes an insulating cylinder 18 formed of ceramic or the like. Flanges 19, 20 formed of cupper are respectively provided at the opposite end sides of the insulating cylinder 18. The flange 19 is provided at its outer peripheral part with cylindrical peripheral section 19a installed to one end of the insulating cylinder 18, while the flange 20 is provided at its outer peripheral part with a cylindrical peripheral section 20a installed to the other end of the insulating cylinder 18. Thus, a vacuum container 24 is constituted by the insulating cylinder 18 and the flanges 19, 20.

Each of the flanges 19, 20 is provided with a projection 19a, 20b located at the central portion of the inner surface side thereof. A positioning pin fitting hole 19c, 20c is formed at the tip face of the projection 19a, 20b. A female thread portion 19d, 20d for installation of an outside connection conductor is formed at the central portion of the outer surface side of the flange 19, 20. A locating pin 21 formed of ceramic is provided between the projections 19b, 20b in such a manner that the opposite end sections of the pin 21 are fitted respectively in the fitting holes 19c, 20c of the projections 19b, 20b.

A plurality of cylindrical electrode plates which have respectively different diameters are coaxially disposed standing on the inner surface of the flange 19 in such a manner as to be spaced a certain distance from each other, thereby forming a stationary electrode 22. Additionally, a plurality of cylindrical electrode plates having different diameters are coaxially disposed standing on the inner surface of the flange 20. Each cylindrical electrode plate is insertable into and withdrawable from a space between the adjacent cylindrical electrode plates of the stationary electrode 22 without contacting with the cylindrical electrode plates of the stationary electrode 22, thereby forming a stationary electrode 23. Thus, since the locating pin 21 is provided, the radial and axial distances between the stationary electrodes 22, 23 are made uniform.

In the vacuum capacitors shown in FIGS. 6 and 7, each of the stationary electrode 6, 22, 23 and the movable electrode 11 includes a plurality of thin and coaxial cylindrical electrode plates, in which the total of the electrostatic capacities each of which is produced by the facing cylindrical electrode plates corresponds to the electrostatic capacity of the whole vacuum capacitor. Here, the electrostatic capacity C per unit length L, of infinite coaxial cylindrical electrodes is represented by an equation (1) which can be applied to finite coaxial cylindrical electrodes.

$$C = 2\pi\epsilon_0 L/\log(b/a) \quad (1)$$

where a is the radius of an inner cylindrical electrode plate, b is the radius of an outer cylindrical electrode plate, $\epsilon_0$ is the vacuum dielectric constant, and L is the length of the cylindrical electrode plates. In case that the electrode 6, 11, 22, 23 is constituted of a plurality of cylindrical electrode plates, the electrostatic capacity of the vacuum capacitor is calculated by totaling the values C each of which is obtained by the above equation (1), in which the voltage proof characteristics at this time is decided by the difference between the radius a of the inner cylindrical electrode plate and the radius b of the outer cylindrical electrode plate.

Prior art documents related to the invention of this application are Japanese Patent Provisional Publication Nos. 6-204082, 7-211588 and 8-97088.

SUMMARY OF THE INVENTION

As discussed above, the value of electrostatic capacity of the vacuum capacitor is decided by the radius a of the inner cylindrical electrode plate, the radius b of the outer cylindrical electrode plate and the length L of the parallel cylindrical electrode plates. However, if the roundness of the cylindrical electrode plates is low, or the production and assembly accuracies are low, a dispersion $\Delta C$ of the electrostatic capacity increases as represented by an equation (2).

$$\Delta C = 2\pi\epsilon_0 L(1+\Delta L)/\log(b(1+\Delta b)/a(1+\Delta a)) \quad (2)$$

where $\Delta b$ is a dispersion in radius of the outer cylindrical electrode, $\Delta a$ is a dispersion in radius of the inner cylindrical electrode, and $\Delta L$ is a dispersion in length L of the parallel cylindrical electrode plates.

In order to improve the dispersion accuracy in electrostatic capacity of the vacuum capacitor, the tolerances of the radius a, radius b and the length L of the parallel cylindrical electrode plates are required to be strictly decided, and it is required to improve the roundness of the cylindrical electrode plates and to improve the dimensional accuracy of parts and production and assembly accuracies. It has been recognized that there is the dispersion in electrostatic capacity of the vacuum capacitor. For example, in the vacuum fixed capacitor, it is generally assumed that there is a dispersion of ±10% in case of not higher than 50 pF, while there is the dispersion of ±5% in case of exceeding 50 pF. However, in recent years, such a dispersion in electrostatic capacity has not been permitted, and it is required to decrease the dispersion into ±0%. In order to decrease the dispersion in electrostatic capacity, it is required to make adjustment with the length L of the parallel cylindrical electrode plates, or to make adjustment by changing the respective distances each of which is between the adjacent cylindrical electrode plates. However, the vacuum fixed capacitor is not provided with a mechanism for mechanically changing the electrostatic capacity. Therefore, the capacitor is required to be high in accuracy in a state of having been produced, or the capacitor is required to be selected within a dispersion range. Otherwise, by adjusting the electrostatic capacity of the vacuum variable capacitor, the vacuum variable capacitor can be used as the vacuum fixed capacitor having no dispersion in electrostatic capacity; however, the bellows as a vacuum-sealed movable part is axially extended and therefore it is impossible to make the vacuum variable capacitor small-sized.

In view of the above, it is an object of the present invention is to provide an improved vacuum capacitor which can effectively overcome drawbacks encountered in conventional vacuum capacitors.

Another object of the present invention is to provide an improved vacuum capacitor which is a vacuum fixed or variable capacitor which is small-sized and less in dispersion of electrostatic capacity.

An aspect of the present invention resides in a vacuum capacitor comprising an insulating cylinder having first and second ends which are opposite to each other. A stationary-side flange is installed to the first end of the insulating cylinder. A stationary electrode supporting plate is installed to an inner surface side of the stationary-side flange. A movable-side flange is installed to the second end of the insulating cylinder. A movable electrode supporting plate is installed to an inner surface side of the movable-side flange through an electrostatic capacity adjusting screw and movable relative to the stationary electrode supporting plate by turning of the electrostatic capacity adjusting screw. Additionally, a diaphragm is sealingly connected between the movable-side flange and the movable electrode supporting plate, the diaphragm having corrugation and defining a vacuum side and an atmospheric side in the vacuum capacitor.

Another aspect of the present invention resides in a vacuum capacitor comprising an insulating cylinder having first and second ends which are opposite to each other. A stationary-side flange is installed to the first end of the insulating cylinder. A stationary electrode supporting plate is installed to an inner surface side of the stationary-side flange. A stationary electrode includes a plurality of cylindrical electrode plates which are coaxially disposed and extended from the stationary electrode supporting plate, the cylindrical electrode plates having respective diameters different from each other so that the adjacent cylindrical electrode plates are spaced from each other by a distance. A movable-side flange is installed to the second end of the insulating cylinder. A movable electrode supporting plate is installed to an inner surface side of the movable-side flange through an electrostatic capacity adjusting screw and movable relative to the stationary electrode supporting plate by turning of the electrostatic capacity adjusting screw. A movable electrode includes a plurality of cylindrical electrode plates which are extended from the movable electrode supporting plate and have respective diameters different from each other, each of the cylindrical electrode plates being insertable into and withdrawable from a space between the adjacent cylindrical electrodes of the stationary electrode without contacting to the cylindrical electrode plates of the stationary electrode. Additionally, a diaphragm is sealingly connected between the movable-side flange and the movable electrode supporting plate, the diaphragm having corrugation and defining a vacuum side and an atmospheric side in the vacuum capacitor.

A further aspect of the present invention resides in a method of producing a vacuum capacitor including an insulating cylinder having first and second ends which are opposite to each other; a stationary-side flange installed to the first end of the insulating cylinder; a stationary electrode supporting plate installed to an inner surface side of the stationary-side flange; a movable-side flange installed to the second end of the insulating cylinder; a movable electrode supporting plate installed to an inner surface side of the movable-side flange through an electrostatic capacity adjusting screw and movable relative to the stationary electrode supporting plate by turning of the electrostatic capacity adjusting screw; and a diaphragm sealingly connected between the movable-side flange and the movable electrode supporting plate, the diaphragm having corrugation and defining a vacuum side and an atmospheric side in the vacuum capacitor. Here, the producing method comprising the step of carrying out a vacuum brazing on constituting members of the vacuum capacitor, upon supporting the movable electrode supporting plate to be prevented from contacting with the stationary electrode supporting plate by using a jig.

A still further aspect of the present invention resides in a method of producing a vacuum capacitor including an insulating cylinder having first and second ends which are opposite to each other; a stationary-side flange installed to the first end of the insulating cylinder; a stationary electrode supporting plate installed to an inner surface side of the stationary-side flange; a stationary electrode including a plurality of cylindrical electrode plates which are coaxially disposed and extended from the stationary electrode supporting plate, the cylindrical electrode plates having respective diameters different from each other so that the adjacent cylindrical electrode plates are spaced from each other by a distance; a movable-side flange installed to the second end of the insulating cylinder; a movable electrode supporting plate installed to an inner surface side of the movable-side flange through an electrostatic capacity adjusting screw and movable relative to the stationary electrode supporting plate by turning of the electrostatic capacity adjusting screw; a movable electrode including a plurality of cylindrical electrode plates which are extended from the movable electrode supporting plate and have respective diameters different from each other, each of the cylindrical electrode plates being insertable into and withdrawable from a space between the adjacent cylindrical electrodes of the stationary electrode without contacting to the cylindrical electrode plates of the stationary electrode; and a diaphragm sealingly connected between the movable-side flange and the movable electrode supporting plate, the diaphragm having corrugation and defining a vacuum side and an atmospheric side in the vacuum capacitor. Here, the producing method comprising the step of carrying out a vacuum brazing on constituting members of the vacuum capacitor, upon supporting the movable electrode supporting plate to be prevented from contacting with at least one of the stationary electrode supporting plate and the stationary electrode by using a jig.

DETAILED DESCRIPTION OF THE INVENTION

Figure 1:
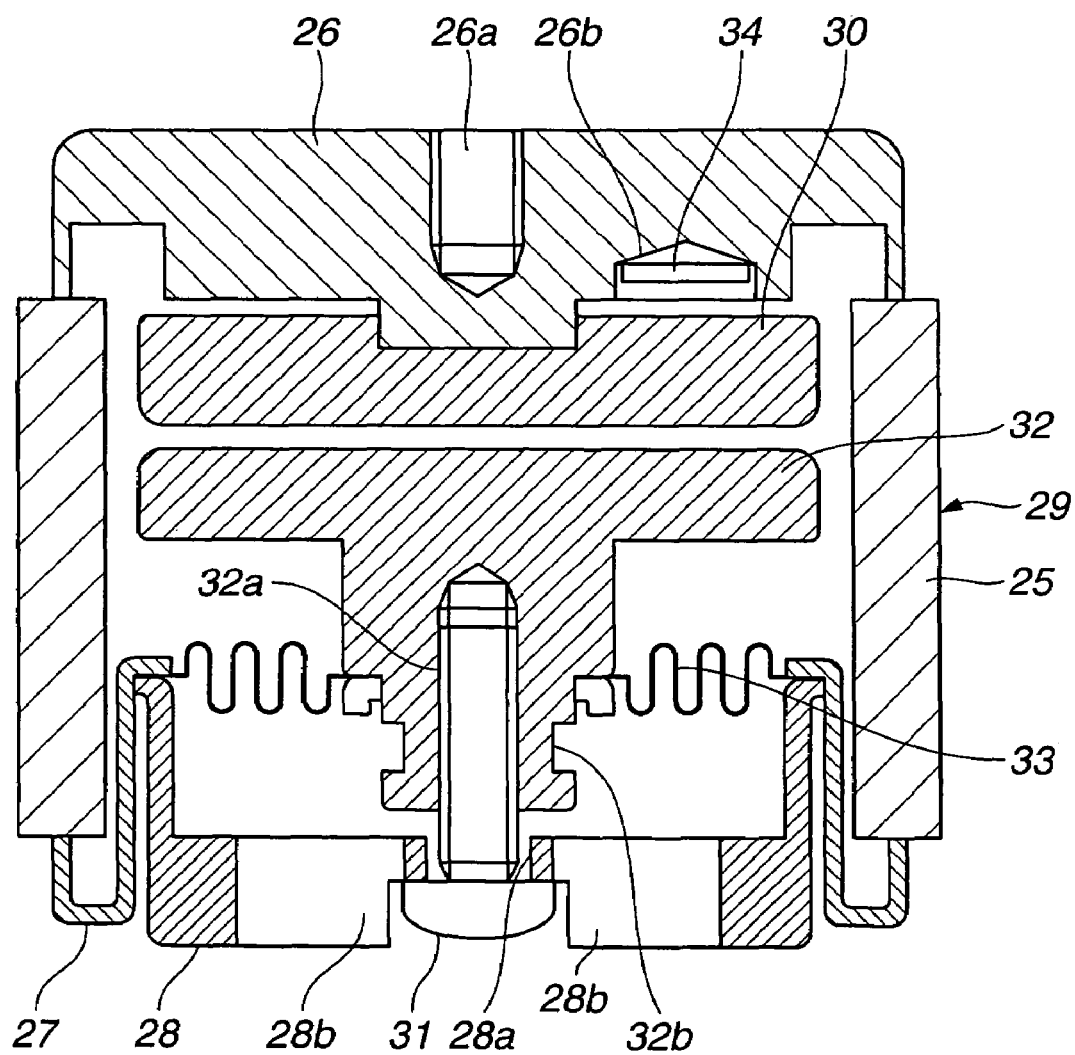
FIG. 1 is a vertical sectional view of a first embodiment of a vacuum capacitor according to the present invention.

Referring now to FIG. 1, a first embodiment of a vacuum capacitor according to the present invention is illustrated including an insulating cylinder 25, in which FIG. 1 is a vertical sectional view of the vacuum capacitor. A stationary-side flange 26 is installed to one end of the insulating cylinder 25, while a movable-side flange 28 is installed through a sealing metal fitting 27 to the other end of the insulating cylinder 25, thereby forming a vacuum container 29. A plate-shaped stationary electrode supporting plate 30 is installed to the inner surface side of the stationary-side flange 26. The stationary-side flange 26 is formed with a female thread portion 26a located at the central portion of the outer surface of the flange 26, an outside connection conductor being to be installed to the female thread portion 26a.

The movable-side flange 28 is formed at its central portion with a through-hole 28a through which an electrostatic capacity adjusting screw 31 is inserted. The screw 31 is engaged with a female thread portion 32a formed at the central portion of the movable electrode supporting plate 32 which is disposed facing the stationary electrode supporting plate 30. The movable electrode supporting plate 32 is formed at its lower section with a jig installation portion or groove 32b to which a jig is to be installed during a vacuum brazing. A plurality of air flowing holes 28b are formed in the movable-side flange 28 and located around the through-hole 28a. A diaphragm 33 is sealingly or hermetically provided between the movable-side flange 28 and the movable electrode supporting plate 32, in which the inside (or upper side in FIG. 1) of the diaphragm serves as a vacuum side where a vacuum is prevailing, while the outside (or lower side in FIG. 1) of the diaphragm serves as an atmospheric side where the atmospheric pressure is prevailing. Additionally, the stationary-side flange 26 is formed at its inner surface with a depression or pocket 26b in which a getter 34 for adsorbing electrons is stored.

Figure 2A:
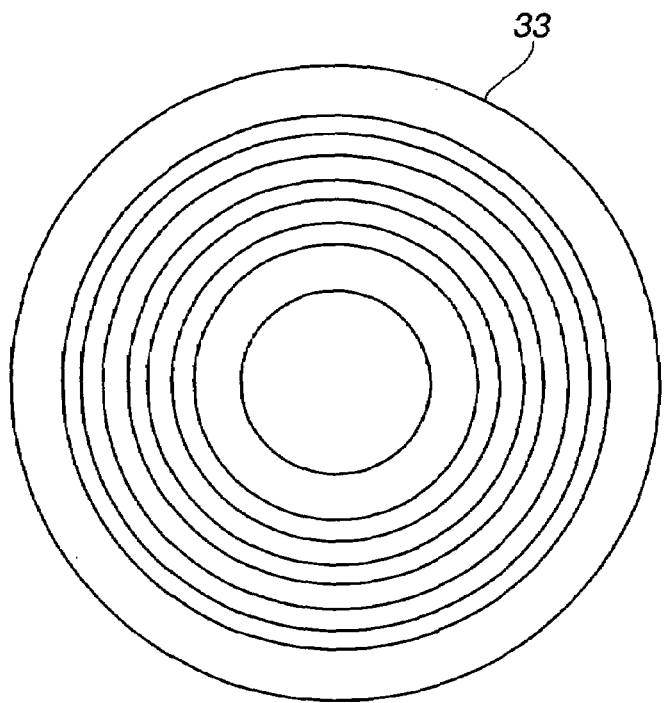
FIG. 2A is a plan view of a diaphragm used in the vacuum capacitor of FIG. 1.
Figure 2B:
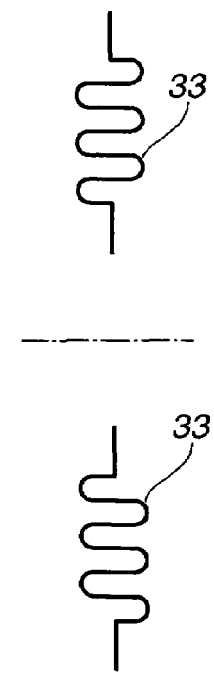
FIG. 2B is a schematic vertical sectional view of the diaphragm of FIG. 2A.

As shown in FIGS. 2A and 2B which are respectively a plan view and a schematic vertical sectional view of the diaphragm 33, the diaphragm 33 has annular corrugations or projections (or waves) which upward and downward project alternately so as to take a waveform in section. The annular corrugations are coaxial as shown in FIG. 2A. The diaphragm 33 is required to be electrically conductive and therefore is formed of a conductive material such as phosphor bronze, beryllium copper, stainless steel coated with copper, stainless steel coated with silver, or the like.

With the above arrangement, the diaphragm 33 is flexible, so that the movable electrode supporting plate 32 is movable upward and downward. Accordingly, the movable electrode supporting plate 32 is movable upward and downward by turning of the electrostatic capacity regulating screw 31, so that the distance between the movable electrode supporting plate 32 and the stationary electrode supporting plate 30 varies thereby changing a electrostatic capacity. As a result, the electrostatic capacity can be fixed or varied, and can be finely adjusted.

Figure 3:
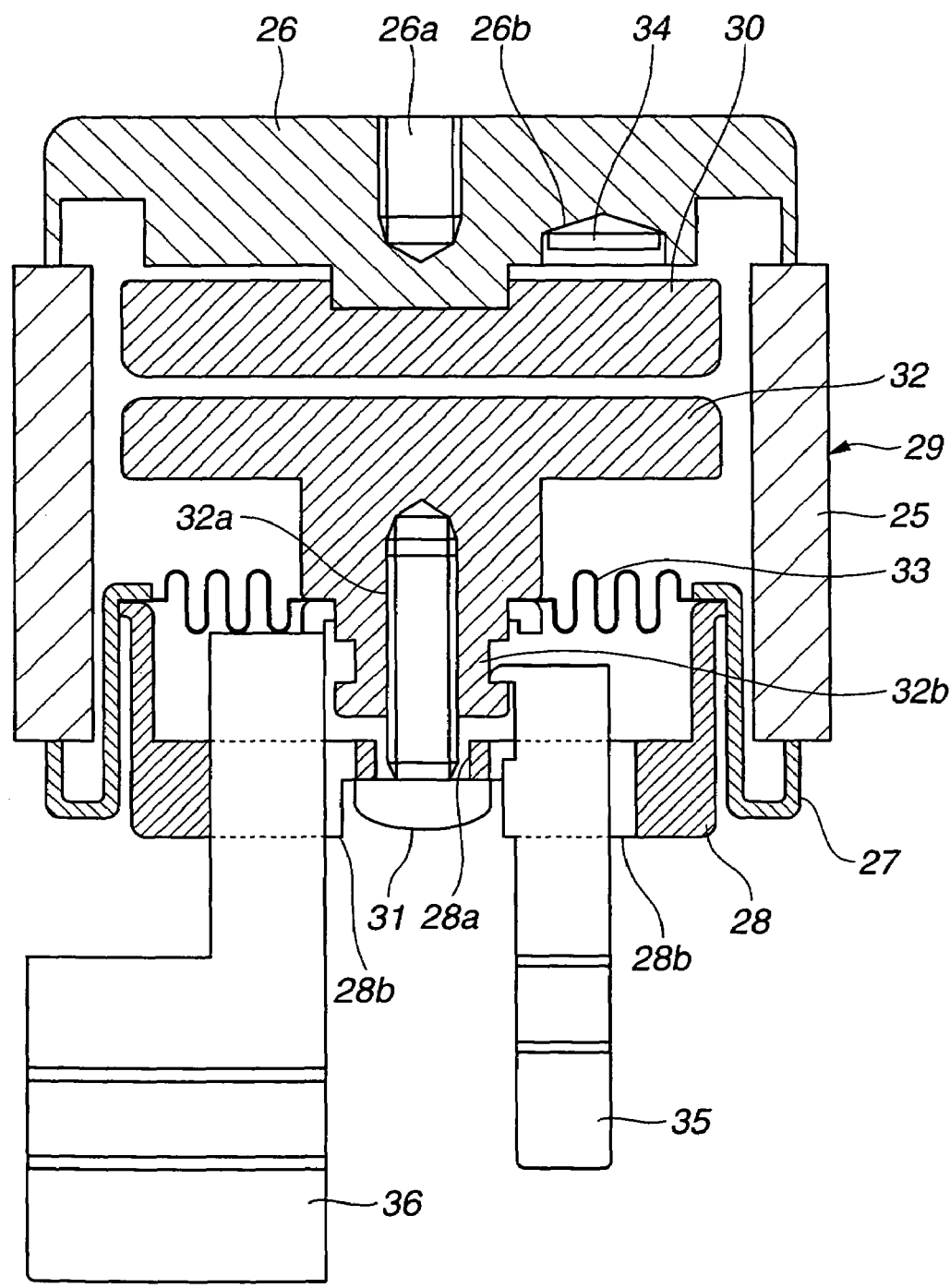
FIG. 3 is a vertical sectional view similar to FIG. 1 but showing a state where a vacuum brazing is carried out for the vacuum capacitor.

When the vacuum brazing is carried out on constituting members or parts of the vacuum capacitor as shown in FIG. 3, jigs 35, 36 are inserted through air-flow holes 28b into the vacuum container 29. Then, the jig 35 is brought into engagement with the jig installation portion 32b thereby preventing the movable electrode supporting plate 32 from being brought into contact with and adhered to the stationary electrode supporting plate 30 during the vacuum brazing. Additionally, the jig 36 supports the movable electrode supporting plate 32 and the diaphragm 33 from the lower side thereby preventing the movable electrode supporting plate 32 from being adhered to the movable-side flange 28.

In the first embodiment, the electrostatic capacity of the vacuum capacitor can be finely adjusted. Additionally, the diaphragm 33 is radially extended as compared with an axially extended bellows thereby making the vacuum capacitor small-sized as a whole. Furthermore, since the vacuum capacitor has no stationary and movable electrodes, the small-sizing the vacuum capacitor can be further promoted while minimizing a dispersion range of the electrostatic capacity. In the vacuum brazing, the movable electrode supporting plate 32 is prevented from being brought into contact with the stationary electrode supporting plate 30 or the movable-side flange 28 under the action of the jigs 35, 36, thereby avoiding adhesion between them. Accordingly, only one vacuum brazing is sufficient to assemble the vacuum capacitor thereby lowering a production cost for the vacuum capacitor. Further, the diaphragm 33 is short in current-flowing path as compared with a bellows, and therefore is low in resistance thereby being small in heat generation. By using a material high in conductivity as the material for the diaphragm 33, the diaphragm 33 can become further little in heat generation while maintaining its sufficient strength. Furthermore, since the getter 34 for adsorbing electrons is disposed in the pocket 26b located at the inner surface of the stationary-side flange 26, a degree of vacuum is kept inside the vacuum capacitor thereby making small the dispersion of the electrostatic capacity while stabling a voltage proof characteristics of the vacuum capacitor.

It will be understood that the size, thickness, wavefrom (sectional shape of corrugation), number of the corrugations (waves) of the diaphragm 33 are not limited to particular ones and free, in which the number of corrugation or wave may be, for example, one so that the radial size of the diaphragm 33 is shortened thereby suppressing a heating value while making the diaphragm low in cost.

Figure 4:
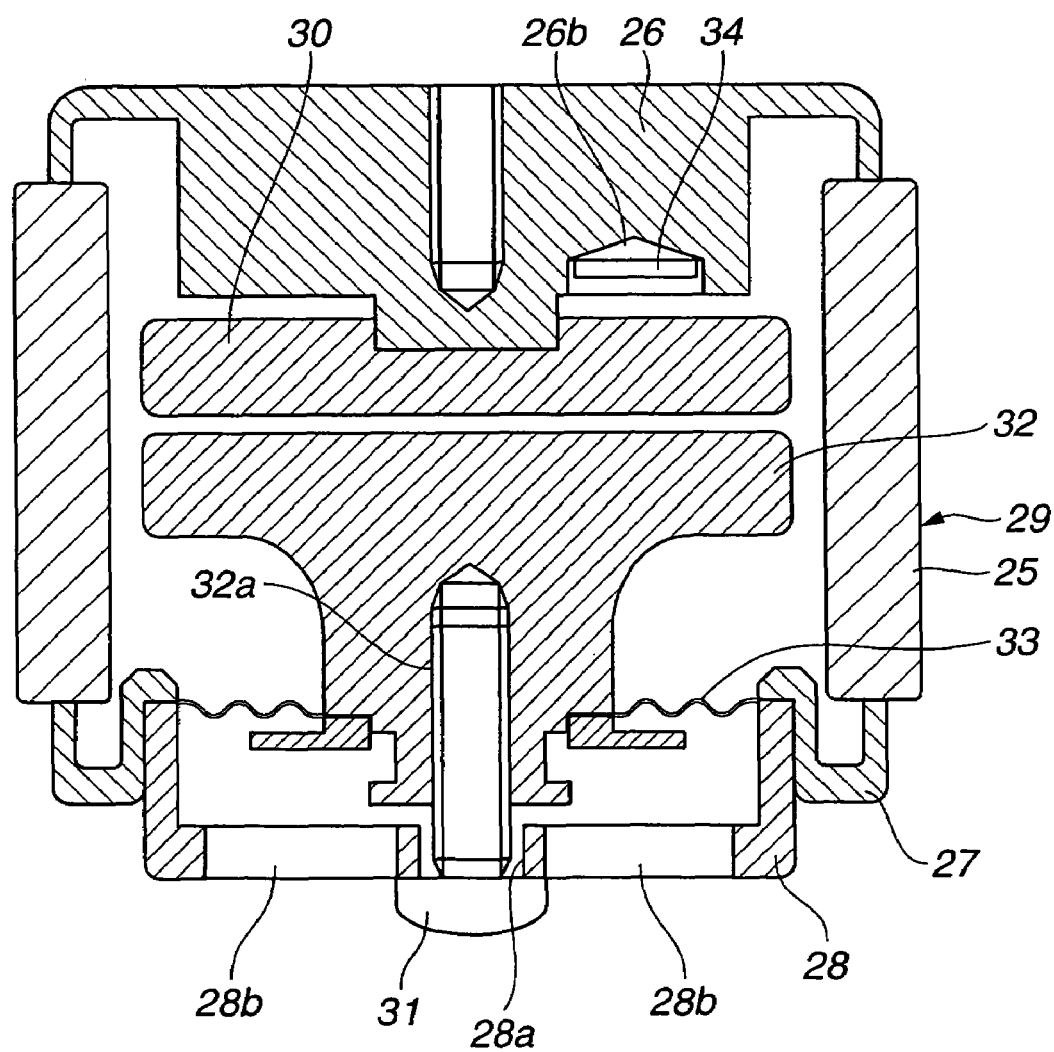
FIG. 4 is a vertical sectional view of a second embodiment of the vacuum capacitor according to the present invention.

FIG. 4 illustrates a second embodiment of the vacuum capacitor according to the present invention as a vertical sectional view, similar to the first embodiment with the exception that the movable electrode supporting plate 32 has a shape wherein corner portions are rounded (a former arrangement), and the diaphragm 33 includes a plurality of diaphragms which lay one upon another (a latter arrangement). The voltage proof characteristics of the vacuum capacitor can be improved by the former arrangement, while a current-carrying ability of the diaphragm 33 can be improved by the latter arrangement. FIG.

Figure 5:
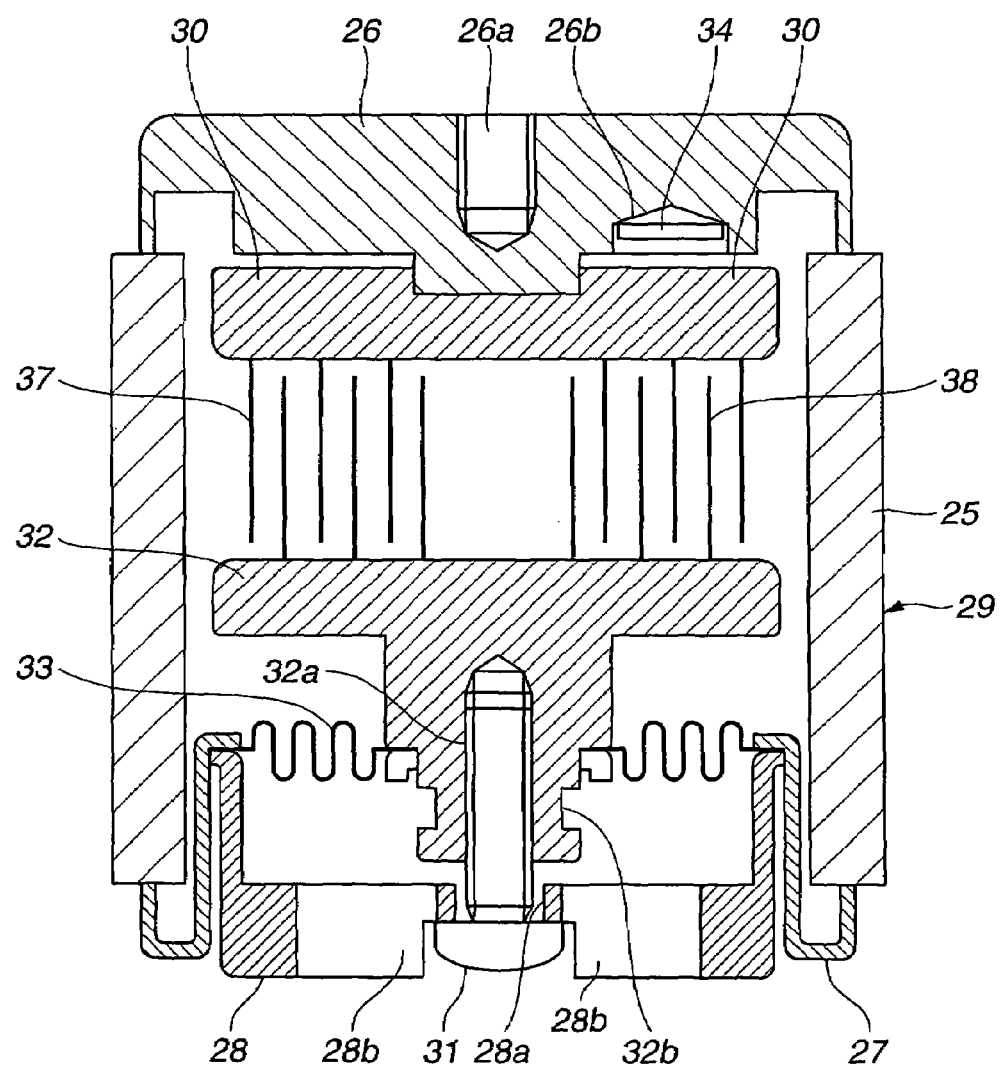
FIG. 5 is a vertical sectional view of a third embodiment of the vacuum capacitor according to the present invention.
Figure 6:
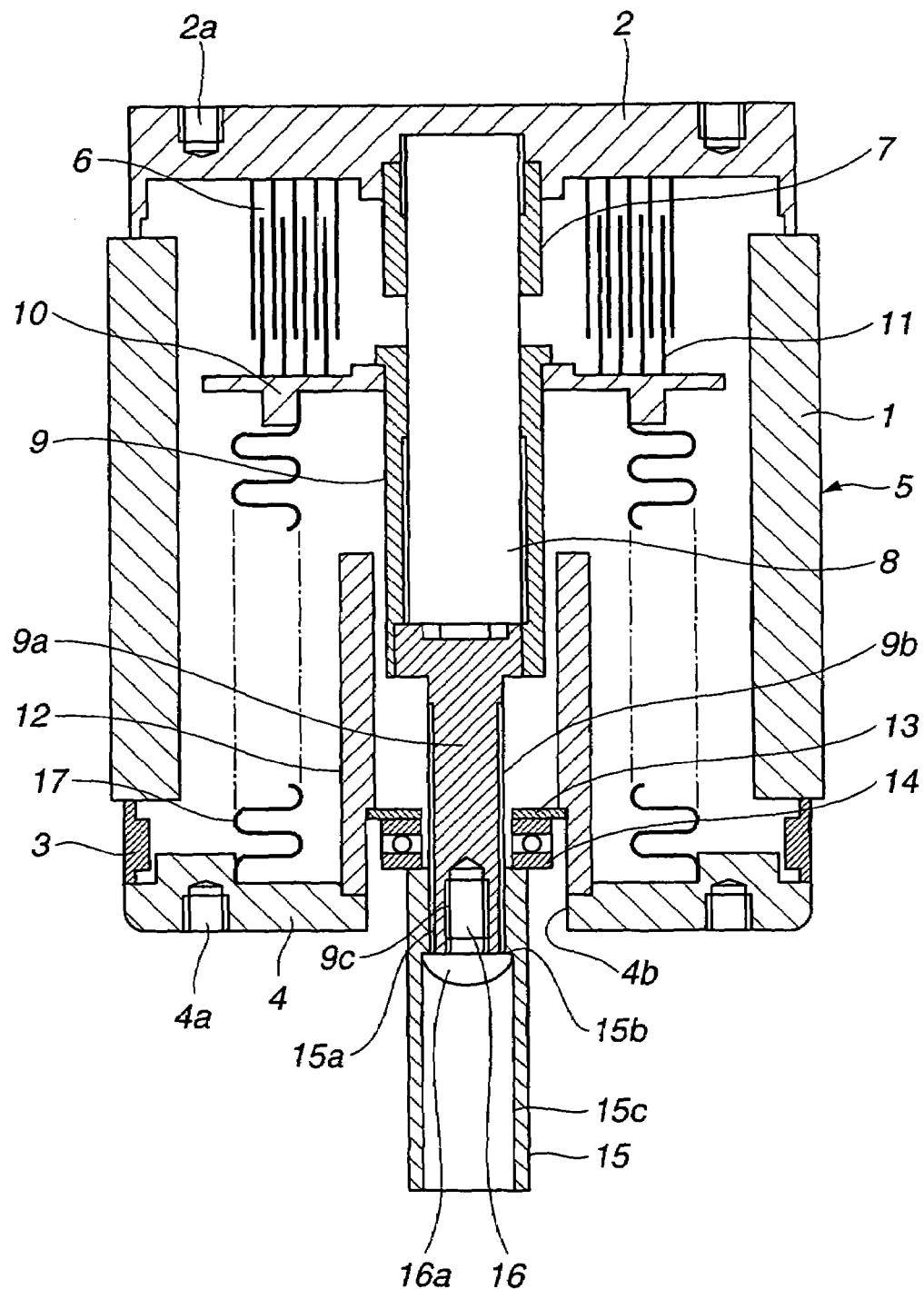
FIG. 6 is a schematic sectional view of an earlier technology vacuum variable capacitor.
Figure 7:
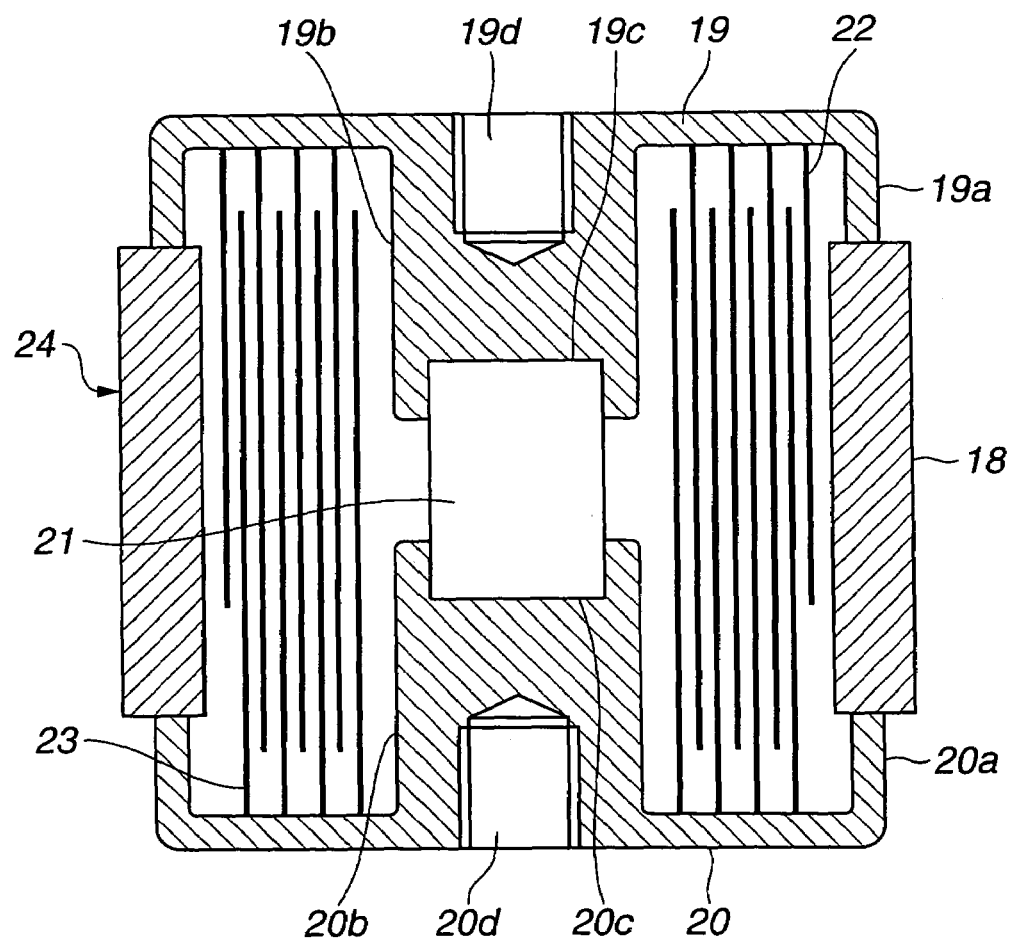
FIG. 7 is a schematic sectional view of an earlier technology vacuum fixed capacitor.

FIG. 5 illustrates a third embodiment of the vacuum capacitor according to the present invention as a vertical sectional view, similar to the first embodiment with the following exceptions: A plurality of cylindrical electrode plates which have respectively different diameters are coaxially disposed extending perpendicularly downward from the stationary electrode supporting plate 30 in such a manner that the adjacent cylindrical plates are spaced a constant distance from each other, thereby forming a stationary electrode 37. Additionally, a plurality of cylindrical electrode plates which have respectively different diameters are coaxially disposed extending perpendicularly upward from the stationary electrode supporting plate 30 in such a manner that the adjacent cylindrical electrode plates are spaced a constant distance from each other, thereby forming a movable electrode 38. The plurality of cylindrical electrode plates of the movable electrode 38 are movable vertically relative to the plurality of cylindrical electrodes of the stationary electrode 32, in which each cylindrical electrode plate of the movable electrode 38 is insertable into and withdrawable from an annular space formed between the adjacent cylindrical electrode plates of the stationary electrode 32 without contact with the cylindrical electrode plates of the stationary electrode 32.

With the above arrangement, the diaphragm 33 is flexible, so that the movable electrode supporting plate 32 is movable upward and downward. Accordingly, the movable electrode supporting plate 32 is movable upward and downward by turning of the electrostatic capacity adjusting screw 31, so that the facing areas (of the facing cylindrical electrode plates of the stationary and movable electrodes 37, 38) formed between the stationary electrode 37 and movable electrode 38 varies thereby changing the electrostatic capacity. Additionally, when the vacuum brazing is carried out on constituting members of the vacuum capacitor, the jigs 35, 36 as shown in FIG. 3 also support the movable electrode supporting plate 32, thereby preventing the movable electrode supporting plate 32 from being brought into contact with and adhered to the stationary electrode 37 and the movable-side flange 28 during the vacuum brazing.

Also in the third embodiment, the electrostatic capacity of the vacuum capacitor can be finely adjusted. By using the diaphragm 33, it is possible to make the vacuum capacitor small-sized. In the vacuum brazing, the movable electrode supporting plate 32 is prevented from its adhesion to the stationary electrode 37 or the like, which lowers the production cost for the vacuum capacitor. Further, the diaphragm 33 is short in current-flowing path and therefore little in heat generation. Furthermore, since the getter 34 is disposed in the pocket 26b of the stationary-side flange 26, a degree of vacuum is kept inside the vacuum capacitor thereby stabling the electrostatic capacity and the voltage proof characteristics of the vacuum capacitor.

In the above embodiments, the material of the constituting members (for example, each flange 26, 28, each electrode supporting plate 30, 32, each electrode 37, 38, and the diaphragm 33) other than the insulating cylinder 25 may be a copper-based alloy available from Mitsubishi Shidoh Co., Ltd. under the trade name of "TAMAC 194". This copper-based alloy (TAMAC 194) has a conductivity of about 68% IACS thereby improving the current-flowing ability of the constituting members. Additionally, this copper-based alloy (TAMAC 194) has a chemical composition whose typical values are Cu: 97.6 wt %, Fe: 2.3 wt %, Zn: 0.12 wt %, and P: 0.03 wt %. The copper-based alloy (TAMAC 194) has mechanical properties in which tensile strength and modulus of longitudinal elasticity are high, so that the constituting members are durable to a high temperature brazing while prolonged in life.

Hereinafter, technical ideas comprehended in the above embodiments will be discussed together with advantageous effects obtained thereby.

(1) A vacuum capacitor comprises an insulating cylinder having first and second ends which are opposite to each other. A stationary-side flange is installed to the first end of the insulating cylinder. A stationary electrode supporting plate is installed to an inner surface side of the stationary-side flange. A movable-side flange is installed to the second end of the insulating cylinder. A movable electrode supporting plate is installed to an inner surface side of the movable-side flange through an electrostatic capacity adjusting screw and movable relative to the stationary electrode supporting plate by turning of the electrostatic capacity adjusting screw. Additionally, a diaphragm is sealingly connected between the movable-side flange and the movable electrode supporting plate, the diaphragm having corrugation and defining a vacuum side and an atmospheric side in the vacuum capacitor.

According to the above idea (1), the electrostatic capacity of the vacuum capacitor can be finely adjusted by turning of the electrostatic capacity adjusting screw. Additionally, the radially extending diaphragm is used in place of an axially extending bellows, and therefore the vacuum capacitor can be made small-sized. A stationary electrode and a movable electrode are not provided, thereby promoting to make the vacuum capacitor small-sized while minimizing a dispersion range of the electrostatic capacity. Further, since using the diaphragm shortens a current-flowing path as compared with using the bellows, a resistance is lowered to decrease heat generation. If the diaphragm is formed of a highly conductive material, the heat generation is further decreased.

(2) A vacuum capacitor comprises an insulating cylinder having first and second ends which are opposite to each other. A stationary-side flange is installed to the first end of the insulating cylinder. A stationary electrode supporting plate is installed to an inner surface side of the stationary-side flange. A stationary electrode includes a plurality of cylindrical electrode plates which are coaxially disposed and extended from the stationary electrode supporting plate, the cylindrical electrode plates having respective diameters different from each other so that the adjacent cylindrical electrode plates are spaced from each other by a distance. A movable-side flange is installed to the second end of the insulating cylinder. A movable electrode supporting plate is installed to an inner surface side of the movable-side flange through an electrostatic capacity adjusting screw and movable relative to the stationary electrode supporting plate by turning of the electrostatic capacity adjusting screw. A movable electrode includes a plurality of cylindrical electrode plates which are extended from the movable electrode supporting plate and have respective diameters different from each other, each of the cylindrical electrode plates being insertable into and withdrawable from a space between the adjacent cylindrical electrodes of the stationary electrode without contacting to the cylindrical electrode plates of the stationary electrode. Additionally, a diaphragm is sealingly connected between the movable-side flange and the movable electrode supporting plate, the diaphragm having corrugation and defining a vacuum side and an atmospheric side in the vacuum capacitor.

According to the above idea (2), it is possible to finely adjust the electrostatic capacity by turning the electrostatic capacity adjusting screw. Additionally, the radially extending diaphragm is used in place of the axially extending bellows, and therefore the vacuum capacitor can be made small-sized. Further, the diaphragm is short in current-flowing path, thereby suppressing the heat generation.

(3) A vacuum capacitor as discussed in the idea (1) or (2), in which a vacuum brazing is carried out on constituting members of the vacuum capacitor, upon supporting the movable electrode supporting plate to be prevented from contacting with at least one of the stationary electrode supporting plate and the stationary electrode by using a jig.

According to the idea (3), during the vacuum brazing for the constituting members, the movable electrode supporting plate is supported by the jig so as to be prevented from contacting with the stationary electrode supporting plate or the stationary electrode, thereby avoiding adhesion of such members.

(4) A vacuum capacitor as discussed in any of the ideas (1) to (3), in which number of the corrugation of the diaphragm is one.

According to the idea (4), the number of the corrugation of the diaphragm is one, and therefore the radial dimension of the diaphragm is shortened, thereby suppressing a heating value while contributing to lowering the cost of the vacuum capacitor.

(5) A vacuum capacitor as discussed in any of the ideas (1) to (4), in which the diaphragm is formed of a conductive material.

According to the idea (5), the diaphragm is formed of the conductive material, thereby decreasing the heat generation while maintaining a suffient strength of the diaphragm.

(6) A vacuum capacitor as discussed in any of the ideas (1) to (5), in which the diaphragm is constituted of a plurality of diaphragms.

According to the idea (6), the diaphragm is constituted of the plurality of diaphragms, thereby improving a current-passing ability of the diaphragm.

(7) A vacuum capacitor as discussed in any of the ideas (1) to (6), in which a getter for adsorbing electrons is disposed to expose to the vacuum side.

According to the idea (7), the getter for absorbing electrons is provided in the vacuum side, and therefore a vacuum degree is maintained in the vacuum side thereby stabling the electrostatic capacity and the voltage proof characteristics.

(8) A vacuum capacitor as discussed in any of the ideas (1) to (7), in which at least one of each of the stationary-side and movable-side flanges, each of the stationary electrode and movable electrode supporting plates, and the diaphragm is formed of a copper alloy containing Cu in amount of 97.6 wt %, Fe in an amount of 2.3 wt %, Zn in an amount of 0.12 wt %, and P in amount of 0.03 wt %.

According to the idea (8), at least one of each of the flanges, each of the electrode supporting plates, each of the electrodes and the diaphragm is formed of the cupper alloy having a particular composition. This improves the conductivity, current-flowing ability and mechanical strength of the vacuum capacitor.

The entire contents of Japanese Patent Application No. 2005-156650, filed May 30, 2005, are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A vacuum capacitor comprising:
an insulating cylinder having first and second ends which are opposite to each other;
a stationary-side flange installed to the first end of the insulating cylinder;
a stationary electrode supporting plate installed to an inner surface side of the stationary-side flange;
a movable-side flange installed to the second end of the insulating cylinder;
a movable electrode supporting plate installed to an inner surface side of the movable-side flange through an electrostatic capacity adjusting screw and movable relative to the stationary electrode supporting plate by turning of the electrostatic capacity adjusting screw; and
a diaphragm sealingly connected between the movable-side flange and the movable electrode supporting plate, the diaphragm having corrugation and defining a vacuum side and an atmospheric side in the vacuum capacitor.

2. A vacuum capacitor as claimed in claim 1, wherein number of the corrugation of the diaphragm is one.

3. A vacuum capacitor as claimed in claim 1, wherein the diaphragm is formed of a conductive material.

4. A vacuum capacitor as claimed in claim 1, wherein the diaphragm is constituted of a plurality of diaphragms.

5. A vacuum capacitor as claimed in claim 1, further comprising a getter for adsorbing electrons, disposed to expose to the vacuum side.

6. A vacuum capacitor as claimed in claim 1, wherein at least one of each of the stationary-side and movable-side flanges, each of the stationary electrode and movable electrode supporting plates, and the diaphragm is formed of a copper alloy containing Cu in amount of about 97.6 wt %, Fe in an amount of about 2.3 wt %, Zn in an amount of about 0.12 wt %, and P in amount of about 0.03 wt %.

7. A vacuum capacitor comprising:
an insulating cylinder having first and second ends which are opposite to each other;
a stationary-side flange installed to the first end of the insulating cylinder;
a stationary electrode supporting plate installed to an inner surface side of the stationary-side flange;
a stationary electrode including a plurality of cylindrical electrode plates which are coaxially disposed and extended from the stationary electrode supporting plate, the cylindrical electrode plates having respective diameters different from each other so that the adjacent cylindrical electrode plates are spaced from each other by a distance;
a movable-side flange installed to the second end of the insulating cylinder;
a movable electrode supporting plate installed to an inner surface side of the movable-side flange through an electrostatic capacity adjusting screw and movable relative to the stationary electrode supporting plate by turning of the electrostatic capacity adjusting screw;
a movable electrode including a plurality of cylindrical electrode plates which are extended from the movable electrode supporting plate and have respective diameters different from each other, each of the cylindrical electrode plates being insertable into and withdrawable from a space between the adjacent cylindrical electrodes of the stationary electrode without contacting to the cylindrical electrode plates of the stationary electrode; and
a diaphragm sealingly connected between the movable-side flange and the movable electrode supporting plate, the diaphragm having corrugation and defining a vacuum side and an atmospheric side in the vacuum capacitor.

8. A vacuum capacitor as claimed in claim 7, wherein number of the corrugation of the diaphragm is one.

9. A vacuum capacitor as claimed in claim 7, wherein the diaphragm is formed of a conductive material.

10. A vacuum capacitor as claimed in claim 7, wherein the diaphragm is constituted of a plurality of diaphragms.

11. A vacuum capacitor as claimed in claim 7, further comprising a getter for adsorbing electrons, disposed to expose to the vacuum side.

12. A vacuum capacitor as claimed in claim 7, wherein at least one of each of the stationary-side and movable-side flanges, each of the stationary electrode and movable electrode supporting plates, each of the stationary and movable electrodes, and the diaphragm is formed of a copper alloy containing Cu in amount of 97.6 wt %, Fe in an amount of 2.3 wt %, Zn in an amount of 0.12 wt %, and P in amount of 0.03 wt %.

13. A method of producing a vacuum capacitor including an insulating cylinder having first and second ends which are opposite to each other; a stationary-side flange installed to the first end of the insulating cylinder; a stationary electrode supporting plate installed to an inner surface side of the stationary-side flange; a movable-side flange installed to the second end of the insulating cylinder; a movable electrode supporting plate installed to an inner surface side of the movable-side flange through an electrostatic capacity adjusting screw and movable relative to the stationary electrode supporting plate by turning of the electrostatic capacity adjusting screw; and a diaphragm sealingly connected between the movable-side flange and the movable electrode supporting plate, the diaphragm having corrugation and defining a vacuum side and an atmospheric side in the vacuum capacitor,
the method comprising the step of
carrying out a vacuum brazing on constituting members of the vacuum capacitor, upon supporting the movable electrode supporting plate to be prevented from contacting with the stationary electrode supporting plate by using a jig.

14. A method of producing a vacuum capacitor including an insulating cylinder having first and second ends which are opposite to each other; a stationary-side flange installed to the first end of the insulating cylinder; a stationary electrode supporting plate installed to an inner surface side of the stationary-side flange; a stationary electrode including a plurality of cylindrical electrode plates which are coaxially disposed and extended from the stationary electrode supporting plate, the cylindrical electrode plates having respective diameters different from each other so that the adjacent cylindrical electrode plates are spaced from each other by a distance; a movable-side flange installed to the second end of the insulating cylinder; a movable electrode supporting plate installed to an inner surface side of the movable-side flange through an electrostatic capacity adjusting screw and movable relative to the stationary electrode supporting plate by turning of the electrostatic capacity adjusting screw; a movable electrode including a plurality of cylindrical electrode plates which are extended from the movable electrode supporting plate and have respective diameters different from each other, each of the cylindrical electrode plates being insertable into and withdrawable from a space between the adjacent cylindrical electrodes of the stationary electrode without contacting to the cylindrical electrode plates of the stationary electrode; and a diaphragm sealingly connected between the movable-side flange and the movable electrode supporting plate, the diaphragm having corrugation and defining a vacuum side and an atmospheric side in the vacuum capacitor, the method comprising the step of carrying out a vacuum brazing on constituting members of the vacuum capacitor, upon supporting the movable electrode supporting plate to be prevented from contacting with at least one of the stationary electrode supporting plate and the stationary electrode by using a jig.

* * * * *